(12) United States Patent
Takaori (10) Patent No.: US 12,173,170 B2
(45) Date of Patent: Dec. 24, 2024

(54) INKJET INK

(71) Applicant: KYOCERA Document Solutions Inc., Osaka (JP)

(72) Inventor: Yasuko Takaori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 208 days.

(21) Appl. No.: 18/159,037

(22) Filed: Jan. 24, 2023

(65) Prior Publication Data

US 2023/0235189 A1 Jul. 27, 2023

(30) Foreign Application Priority Data

Jan. 26, 2022 (JP) ................. 2022-010014

(51) Int. Cl.
| | |
|---|---|
| C09D 11/38 | (2014.01) |
| C09D 11/322 | (2014.01) |
| C09D 11/36 | (2014.01) |

(52) U.S. Cl.
CPC ............ C09D 11/38 (2013.01); C09D 11/322 (2013.01); C09D 11/36 (2013.01)

(58) Field of Classification Search
CPC .............................. C09D 11/38; C09D 11/322
See application file for complete search history.

(56) References Cited

U.S. PATENT DOCUMENTS

2021/0032484 A1* 2/2021 Ozawa .................... C08L 33/10

FOREIGN PATENT DOCUMENTS

| CA | 3087167 A1 * | 7/2019 | ............... B05D 1/36 |
|---|---|---|---|
| EP | 3 904 470 A1 | 11/2021 | |
| JP | 2020-105299 A | 7/2020 | |

* cited by examiner

*Primary Examiner* — Sharon Polk
(74) *Attorney, Agent, or Firm* — Studebaker & Brackett PC (57) ABSTRACT

An inkjet ink contains a pigment, resin particles, dipropylene glycol monomethyl ether, triethylene glycol monobutyl ether, and propylene glycol. The resin particles contain polycarbonate polyurethane resin. The resin particles have a percentage content of at least 2.0% by mass and no greater than 9.0% by mass. The dipropylene glycol monomethyl ether has a percentage content of at least 7.0% by mass and no greater than 27.0% by mass. The triethylene glycol monobutyl ether has a percentage content of at least 4.0% by mass and no greater than 12.0% by mass. The propylene glycol has a percentage content of at least 4.0% by mass and no greater than 18.0% by mass.

3 Claims, 3 Drawing Sheets

INKJET INK

INCORPORATION BY REFERENCE

The present application claims priority under 35 U.S.C. § 119 to Japanese Patent Application No. 2022-010014, filed on Jan. 26, 2022. The contents of this application are incorporated herein by reference in their entirety.

BACKGROUND

The present disclosure relates to an inkjet ink.

Some inkjet recording apparatuses use a water-based inkjet ink containing a pigment and an aqueous medium. The inkjet ink is required to be excellent in ejection stability. The inkjet recording apparatuses may form an image on a non-permeable recording medium such as a biaxially oriented polypropylene (OPP) film.

When an image is formed on a non-permeable recording medium using such an inkjet recording apparatus, the image tends to have an image defect. One example of the image defect is "mixed color bleeding" in which colors are mixed at a boundary part where different colors are adjacent to each other in an image to bleed around the boundary part. Another example of the image defect is "local agglomeration" in which an ink component agglomerates on the surface of a recording medium to form a non-uniform ink film on the surface of the recording medium, leading to a formed image being whitish. An image formed on a non-permeable recording medium using the inkjet recording apparatus tends to have poor adhesion to the recording medium, with a result that the image may peel off from the recording medium upon being rubbed by another member. As such, an inkjet ink used for such applications is required, even in image formation on a non-permeable recording medium, to be able to form images without mixed color bleeding and local agglomeration and with excellent adhesion to the recording medium.

To meet such requirements, an inkjet ink is proposed for example that is a water-based ink for inkjet printing on a low-absorbency recording medium containing a pigment, a polymer dispersant, water, and a water-soluble organic solvent containing polypropylene glycol monoalkyl ether. The above inkjet ink is thought to be able to form images with excellent adhesion to a low-absorbency recording medium. Impartment of quick drying to an inkjet ink is generally effective in inhibition of mixed color bleeding.

SUMMARY

An inkjet ink according to an aspect of the present disclosure contains a pigment, resin particles, dipropylene glycol monomethyl ether, triethylene glycol monobutyl ether, and propylene glycol. The resin particles contain polycarbonate polyurethane resin. The resin particles have a percentage content of at least 2.0% by mass and no greater than 9.0% by mass. The dipropylene glycol monomethyl ether has a percentage content of at least 7.0% by mass and no greater than 27.0% by mass. The triethylene glycol monobutyl ether has a percentage content of at least 4.0% by mass and no greater than 12.0% by mass. The propylene glycol has a percentage content of at least 4.0% by mass and no greater than 18.0% by mass.

DETAILED DESCRIPTION

The following describes an embodiment of the present disclosure. In the following, values for volume median diameter (D50) are values as measured using a dynamic light scattering type particle size distribution analyzer ("ZETASIZER NANO ZS", product of Malvern Instruments Ltd.) unless otherwise stated. In the present specification, the term "(meth)acryl" may be used as a generic term for both acryl and methacryl.

<Ink>

The following describes an inkjet ink (also referred to below simply as ink) according to an embodiment of the present disclosure. The ink of the present disclosure contains a pigment, resin particles, dipropylene glycol monomethyl ether, triethylene glycol monobutyl ether, and propylene glycol. The resin particles contain polycarbonate polyurethane resin. The resin particles have a percentage content of at least 2.0% by mass and no greater than 9.0% by mass. The dipropylene glycol monomethyl ether has a percentage content of at least 7.0% by mass and no greater than 27.0% by mass. The triethylene glycol monobutyl ether has a percentage content of at least 4.0% by mass and no greater than 12.0% by mass. The propylene glycol has a percentage content of at least 4.0% by mass and no greater than 18.0% by mass.

The ink of the present disclosure is suitable for image formation on a non-permeable recording medium. The non-permeable recording medium is inferior in ink permeability to a permeable recording medium. The amount of an aqueous medium absorbed by the non-permeable recording medium is no greater than $1.0 \text{ g/m}^2$, for example. Examples of the non-permeable recording medium include resin recording mediums, metal recording mediums, and glass recording mediums. Examples of the resin recording mediums include a resin sheet and a resin film. The resin contained in the resin recording mediums is preferably a thermoplastic resin. Specific examples of the resin include polyethylene, polypropylene, polyvinyl chloride, and polyethylene terephthalate (PET). Examples of the resin recording mediums include an OPP film and a PET film. In a case of image formation on a resin recording medium with the ink of the present disclosure, the recording medium may have a surface (printing surface) subjected to corona discharge.

As a result of having the above features, the ink of the present disclosure is excellent in ejection stability and enables formation of images with excellent adhesion to a non-permeable recording medium with mixed color bleeding and local agglomeration inhibited. The reasons thereof may be presumed as follows. The ink of the present disclosure contains a certain amount or more of resin particles. The resin particles function as a binder to ensure adhesion of an image formed with the ink of the present disclosure to a recording medium. Therefore, in image formation on a non-permeable recording medium, the ink of the present disclosure can form images with excellent adhesion to the recording medium. The resin particles containing polycarbonate polyurethane resin are excellent in preservation stability and film formability. As a result of the resin particles containing polycarbonate polyurethane resin, the ink of the present disclosure can form a uniform ink film on a non-permeable recording medium. Therefore, the ink of the present disclosure can inhibit occurrence of local agglomeration in image formation on a non-permeable recording medium.

The ink of the present disclosure contains dipropylene glycol monomethyl ether, triethylene glycol monobutyl ether, and propylene glycol. In the following, the three solvents are each referred as specific organic solvent. The specific organic solvents each tend to have lower boiling point and vapor pressure than the other organic solvents. Among the specific organic solvents, dipropylene glycol monomethyl ether has particularly low boiling point and vapor pressure. By contrast, propylene glycol has slightly high boiling point and vapor pressure among the specific organic solvents. As a result of the dipropylene glycol monomethyl ether having a certain percentage content or more and the propylene glycol having a certain percentage content or more, the ink of the present disclosure is moderately easy to dry. Furthermore, triethylene glycol monobutyl ether is low in surface free energy to a non-permeable recording medium. Therefore, as a result of containing triethylene glycol monobutyl ether, the ink of the present disclosure has remarkable wettability to a non-permeable recording medium. As a result, ink droplets of the ink of the present disclosure moderately spread directly after landing on the surface of a non-permeable recording medium to increase its specific surface area. Therefore, the ink of the present disclosure tends to quickly dry on the surface of the non-permeable recording medium. With the above, the ink of the present disclosure can exhibit moderate quick drying to inhibit occurrence of mixed color bleeding.

By contrast, an ink with excessively excellent quick drying containing an excessive amount of resin particles tends to cause precipitation of a solid content in ink attachment to the vicinity of a nozzle of a recording head. This serves as a cause of discharge failure. By contrast, the ink of the present disclosure has a certain percentage content or less of the resin particles, which does not mean containment of an excessive amount of the resin particles. The dipropylene glycol monomethyl ether and the triethylene glycol monobutyl ether each have a certain percentage content or less in the ink of the present disclosure, which means that quick-drying of the ink of the present disclosure is not excessively excellent. Furthermore, the ink of the present disclosure contains propylene glycol that exhibits moisturizing effect. The propylene glycol inhibits precipitation of a solid content in attachment of the ink of the present disclosure to the vicinity of the nozzle of the recording head. With the above, the ink of the present disclosure is excellent in ejection stability.

The ink of the present disclosure will be described further in detail below. Note that one type of each component described in the following description may be used independently, or two or more types of the component may be used in combination.

[Pigment]

The pigment in the ink of the present disclosure forms pigment particles together with a pigment coating resin, for example. The pigment particles each include a core containing the pigment and the pigment coating resin covering the core. The pigment coating resin is present in a dispersed state in a solvent, for example. From the viewpoint of optimization of color density, hue, or stability of the ink of the present disclosure, the pigment particles have a volume median diameter of preferably at least 30 nm and no greater than 200 nm, and more preferably at least 70 nm and no greater than 130 nm.

Examples of the pigment include yellow pigments, orange pigments, red pigments, blue pigments, violet pigments, and black pigments. Examples of the yellow pigments include C.I. Pigment Yellow (74, 93, 95, 109, 110, 120, 128, 138, 139, 151, 154, 155, 173, 180, 185, or 193). Examples of the orange pigments include C.I. Pigment Orange (34, 36, 43, 61, 63, or 71). Examples of the red pigments include C.I. Pigment Red (122 or 202). Examples of the blue pigments include C.I. Pigment Blue (15, specifically, 15:3). Examples of the violet pigments include C.I. Pigment Violet (19, 23, or 33). Examples of the black pigments include C.I. Pigment Black (7).

The pigment has a percentage content of preferably at least 0.5% by mass and no greater than 10.0% by mass in the ink of the present disclosure, and more preferably at least 1.5% by mass and no greater than 5.0% by mass. As a result of the percentage content of the pigment being set to at least 0.5% by mass, the ink of the present disclosure can form images with desired image density. As a result of the percentage content of the pigment being set to no greater than 10.0% by mass by contrast, fluidity of the ink of the present disclosure can be ensured.

[Pigment Coating Resin]

The pigment coating resin is a resin soluble in a solvent of the ink of the present disclosure. A portion of the pigment coating resin is present on the surfaces of the pigment particles, for example, to optimize dispersibility of the pigment particles. Another portion of the pigment coating resin is present in a dissolved state in the solvent of the ink of the present disclosure, for example.

The pigment coating resin is preferably styrene-(meth)acrylic resin. The styrene-(meth)acrylic resin includes a styrene unit and a repeating unit derived from at least one monomer of (meth)acrylic acid alkyl ester and (meth)acrylic acid. Examples of the (meth)acrylic acid alkyl ester include methyl (meth)acrylate, ethyl (meth)acrylate, propyl (meth)acrylate, and butyl (meth)acrylate. The styrene-(meth)acrylic resin is preferably a copolymer of styrene, methyl methacrylate, methacrylic acid, and butyl acrylate.

The pigment coating resin has a percentage content of preferably at least 0.1% by mass and no greater than 4.0% by mass in the ink of the present disclosure, and more preferably at least 0.5% by mass and no greater than 1.5% by mass. As a result of the percentage content of the pigment coating resin being set to at least 0.1% by mass and no greater than 4.0% by mass, ejection stability of the ink of the present disclosure can be ensured.

The content ratio of the pigment coating resin to 100 parts by mass of the pigment is preferably at least 10 parts by mass and no greater than 60 parts by mass in the ink of the present disclosure, and more preferably at least 20 parts by mass and no greater than 30 parts by mass. As a result of the content ratio of the pigment coating resin being set to at least 10 parts by mass and no greater than 60 parts by mass, ejection stability of the ink of the present disclosure can be further optimized.

[Resin Particles]

The resin particles contain polycarbonate polyurethane resin. The polycarbonate polyurethane resin has a percentage content of preferably at least 80% by mass in the pigment particles, more preferably at least 90% by mass, and further preferably 100% by mass.

The resin particles have a volume median diameter of preferably at least 50 nm and no greater than 200 nm, and more preferably at least 70 nm and no greater than 150 nm. As a result of the volume median diameter of the resin particles being set to at least 50 nm, preservation stability of the ink of the present disclosure can be optimized. As a result of the volume median diameter of the resin particles being set to no greater 200 nm, ejection stability of the ink of the present disclosure can be further optimized.

The resin particles have a percentage content of at least 2.0% by mass and no greater than 9.0% by mass in the ink of the present disclosure, and preferably at least 4.0% by mass and no greater than 6.0% by mass. As a result of the percentage content of the resin particles being set to at least 2.0% by mass, the ink of the present disclosure can form an image with excellent adhesion to a non-permeable recording medium in image formation on the non-permeable recording medium. As a result of the percentage content of the resin particles being set to no greater than 9.0% by mass, ejection stability of the ink of the present disclosure can be optimized.

(Polycarbonate Polyurethane Resin)

The polycarbonate polyurethane resin is a copolymer of monomers including polycarbonate diol and polyisocyanate. The monomers of the polycarbonate polyurethane resin may further include a bisphenol compound or a diol compound (also referred to below as different diol compound) other than the polycarbonate diol in addition to the polycarbonate diol and the polyisocyanate.

The polycarbonate diol refers to a long chain diol with a carbonate structure (—C—CO—C—) having a hydroxy group at each of the opposite ends thereof. Examples of the polycarbonate diol include polyhexamethylene carbonate diol, polypentamethylene carbonate diol, 3-methyl-5-pentane-carbonate diol, and polytetramethylene carbonate diol.

Examples of the polyisocyanate include diisocyanates. Examples of the diisocyanates include aliphatic diisocyanates, alicyclic diisocyanates, and aromatic diisocyanates.

Examples of the aliphatic diisocyanates include ethylene diisocyanate, 2,2,4-trimethylhexamethylene diisocyanate, and 1,6-hexamethylene diisocyanate.

Examples of the alicyclic diisocyanates include hydrogenated 4-4'-diphenylmethane diisocyanate, 1,4-cyclohexane diisocyanate, methylcyclohexylene diisocyanate, isophorone diisocyanate, and norbornane diisocyanate.

Examples of the aromatic diisocyanates include 4,4'-diphenylmethane diisocyanate, xylylene diisocyanate, toluene diisocyanate, and naphthalene diisocyanate.

Examples of the different diol compound include ethylene glycol, diethylene glycol, triethylene glycol, 1,2-propanediol, 1,3-propanediol, 1,4-butanediol, neopentyl glycol, 2-butene-1,4-diol, 1,5-pentanediol, 2-pentene-1,5-diol, 1,6-hexanediol, 1,4-cyclohexanedimethanol, dipropylene glycol, 1,4-benzenediol, polyethylene glycol, polypropylene glycol, and polytetramethylene glycol.

Examples of the bisphenol compound include bisphenol A, hydrogenated bisphenol A, an ethylene oxide adduct of bisphenol A (e.g., polyoxyethylene(2,2)-2,2-bis(4-hydroxyphenyl)propane), and a propylene oxide adduct of bisphenol A.

[Dipropylene Glycol Monomethyl Ether]

The dipropylene glycol monomethyl ether has a percentage content of at least 7.0% by mass and no greater than 27.0% by mass in the ink of the present disclosure, more preferably at least 12.0% by mass and no greater than 22.0% by mass, and further preferably at least 15.0% by mass and no greater than 19.0% by mass. As a result of the percentage content of the dipropylene glycol monomethyl ether being set to at least 7.0% by mass, the ink of the present disclosure can inhibit occurrence of mixed color bleeding in image formation on a non-permeable recording medium. As a result of the percentage content of the dipropylene glycol monomethyl ether being set to no greater than 27.0% by mass, ejection stability of the ink of the present disclosure can be optimized.

[Triethylene Glycol Monobutyl Ether]

The triethylene glycol monobutyl ether has a percentage content of at least 4.0% by mass and no greater than 12.0% by mass in the ink of the present disclosure, and more preferably at least 7.0% by mass and no greater than 9.0% by mass. As a result of the percentage content of the triethylene glycol monobutyl ether being set to at least 4.0% by mass, the ink of the present disclosure can inhibit occurrence of mixed color bleeding in image formation on a non-permeable recording medium. As a result of the percentage content of the triethylene glycol monobutyl ether being set to no greater than 12.0% by mass, ink droplets of the ink of the present disclosure can be inhibited from excessively spreading and coalescing with other adjacent ink droplets in landing on the surface of a recording medium. This enables the ink of the present disclosure to inhibit occurrence of mixed color bleeding in image formation on a non-permeable recording medium.

[Propylene Glycol]

The propylene glycol has a percentage content of at least 4.0% by mass and no greater than 18.0% by mass in the ink of the present disclosure, preferably at least 6.0% by mass and no greater than 13.0% by mass, and more preferably at least 8.0% by mass and no greater than 10.5% by mass. As a result of the percentage content of the propylene glycol being set to at least 4.0% by mass, ejection stability of the ink of the present disclosure can be optimized. As a result of the percentage content of the propylene glycol being set to no greater than 18.0% by mass, the ink of the present disclosure can inhibit occurrence of mixed color bleeding in image formation on a non-permeable recording medium.

The total percentage content of the specific organic solvents is preferably at least 17.0% by mass and no greater than 50.0% by mass in the ink of the present disclosure, and more preferably at least 30.0% by mass and no greater than 40.0% by mass. As a result of the total percentage content of the specific organic solvents being set to no greater than 17.0% by mass, the ink of the present disclosure can reliably inhibit occurrence of mixed color bleeding in image formation on a non-permeable recording medium. As a result of the total percentage content of the specific organic solvents being set to no greater than 50.0% by mass, preservation stability of the ink of the present disclosure can be optimized.

[Different Water-Soluble Organic Solvent]

The ink of the present disclosure may contain a trace amount of a water-soluble organic solvent (also referred to below as different water-soluble organic solvent) other than the specific organic solvents. However, the different water-soluble organic solvent tends to impair quick drying of the ink of the present disclosure. Therefore, the ink of the present disclosure preferably does not contain the different water-soluble organic solvent. The percentage content of the different water-soluble organic solvent is preferably no greater than 5.0% by mass in the ink of the present disclosure, more preferably no greater than 1.0% by mass, and further preferably 0.0% by mass.

[Water]

The water has a percentage content of preferably at least 30.0% by mass and no greater than 75.0% by mass in the ink of the present disclosure, and more preferably at least 40.0% by mass and no greater than 60.0% by mass.

[Surfactant]

Preferably, the ink of the present disclosure further contains a surfactant. The surfactant optimizes compatibility and dispersion stability of each component contained in the ink of the present disclosure. Furthermore, the surfactant optimizes wettability of the ink of the present disclosure to a recording medium. The surfactant in the ink of the present disclosure is preferably a nonionic surfactant.

Examples of the nonionic surfactant in the ink of the present disclosure include an acetylene glycol surfactant (surfactant containing an acetylene glycol compound), a silicone surfactant (surfactant containing a silicone compound), and a fluorine surfactant (surfactant containing fluororesin or a fluorine-containing compound). Examples of the acetylene glycol surfactant include an ethylene oxide adduct of acetylene glycol and a propylene oxide adduct of acetylene glycol.

The ink of the present disclosure preferably contains an acetylene glycol surfactant and a silicone surfactant.

The percentage content of the surfactant in the ink of the present disclosure is preferably at least 0.1% by mass and no greater than 2.0% by mass, and more preferably at least 0.2% by mass and no greater than 0.6% by mass. Furthermore, the ink of the present disclosure preferably contains at least 0.1% by mass and no greater than 0.4% by mass of an acetylene glycol surfactant and at least 0.1% by mass and no greater than 0.4% by mass of a silicone surfactant.

[Other Components]

The ink of the present disclosure may further contain a known additive (e.g., a solution stabilizer, an anti-drying agent, an antioxidant, a viscosity modifier, a pH adjuster, and an antifungal agent) as necessary.

[Ink Production Method]

The ink of the present disclosure can be produced for example by uniformly mixing a pigment dispersion containing the pigment, a resin emulsion containing the resin particles, dipropylene glycol monomethyl ether, triethylene glycol monobutyl ether, propylene glycol, and other components (e.g., water and a surfactant) added as necessary using a stirrer. In production of the ink of the present disclosure, uniform mixing of each component may followed by removal of foreign matter and coarse particles using a filter (e.g., a filter with a pore size of no greater than 5 μm).

(Pigment Dispersion)

The pigment dispersion is a dispersion containing the pigment. Preferably, the pigment dispersion further contains the pigment coating resin. Water is preferable as a dispersion medium of the pigment dispersion.

The percentage content of the pigment in the pigment dispersion is preferably at least 5.0% by mass and no greater than 25.0% by mass, and more preferably at least 10.0% by mass and no greater than 20.0% by mass. The percentage content of the pigment coating resin in the pigment dispersion is preferably at least 1.0% by mass and no greater than 10.0% by mass, and more preferably at least 2.0% by mass and no greater than 6.0% by mass.

The pigment dispersion can be prepared by wet dispersion of the pigment, the pigment coating resin, the dispersion medium (e.g., water), and a component (e.g., a surfactant) added as necessary using a media type wet disperser. In wet dispersion using a media type wet disperser, small-diameter beads (e.g., beads with a $D_{50}$ of at least 0.5 mm and no greater than 1.0 mm) may be used as a medium. No particular limitations are placed on the material of the beads but the material of the beads is preferably a hard material (e.g., glass or zirconia).

In a case in which the pigment dispersion is added in production of the ink of the present disclosure, the percentage content of the pigment dispersion to all the raw materials of the ink is at least 10.0% by mass and no greater than 40.0% by mass, for example.

(Resin Emulsion)

The resin emulsion is a dispersion containing the resin particles. Water is preferable as a dispersion medium of the resin emulsion.

The percentage content of the resin particles in the resin emulsion is preferably at least 10.0% by mass and no greater than 40.0% by mass, and more preferably at least 20.0% by mass and no greater than 35.0% by mass.

In adding the resin emulsion in production of the ink of the present disclosure, the percentage content of the resin emulsion to all the raw materials of the ink is at least 3.0% by mass and no greater than 45.0% by mass, for example.

EXAMPLES

The following describes examples of the present disclosure. However, the present disclosure is not limited to the following examples.

[Pigment Dispersion Preparation]

Pigment dispersions (C), (Y), (M), and (BK) were prepared for use in ink preparation. Table 1 shows the components contained in each pigment dispersion and the amounts thereof.

TABLE 1

| | | Pigment dispersion (C) | Pigment dispersion (Y) | Pigment dispersion (M) | Pigment dispersion (BK) |
|---|---|---|---|---|---|
| Percentage content [% by mass] | Water | 80 | 80 | 80 | 80 |
| | Resin A-Na | 5 | 5 | 5 | 5 |
| | Cyan pigment | 15 | — | — | — |
| | Yellow pigment | — | 15 | — | — |
| | Magenta pigment | — | — | 15 | — |
| | Black pigment | — | — | — | 15 |
| | Total | 100 | 100 | 100 | 100 |

In Table 1, "Resin A-Na" indicates a resin A (pigment coating resin) neutralized with sodium hydroxide (NaOH). "Cyan pigment", "Yellow pigment", "Magenta pigment", and "Black pigment" indicate as follows.

Cyan pigment: "HELIOGEN (registered Japanese trademark) Blue D7088" produced by BASF Corporation     Yellow pigment: "PALCOHOL YELLOW D1115J" produced by BASF Corporation     Magenta pigment: "MAGENTA D4550" produced by BASF Corporation     Black pigment: "MONARCH (registered Japanese trademark) 800" produced by Cabot Corporation

[Preparation of Resin A]

The following method was used for preparing a resin A for obtaining "Resin A-Na" in Table 1. In detail, a stirrer, a nitrogen inlet tube, a condenser, and a dropping funnel were set at a four-necked flask. Next, 100 parts by mass of isopropyl alcohol and 300 methyl ethyl ketone were added into the flask. Heat reflux at 70° C. was carried out on the flask contents under nitrogen bubbling.

Next, a solution L1 was prepared. In detail, 40.0 parts by mass of styrene, 10.0 parts by mass of methacrylic acid, 40.0 parts by mass of methyl methacrylate, 10.0 parts by mass of butyl acrylate, and 0.4 parts by mass of azobisisobutyronitrile (AIBN, a polymerization initiator) were mixed to yield a solution L1 being a monomer solution. The solution L1 was dripped into the flask over 2 hours in a state in which heat reflux at 70° C. was carried out on the flask contents. After the dripping, heat reflux at 70° C. was carried out on the flask contents for additional 6 hours.

Next, a solution L2 was prepared. In detail, 0.2 parts by mass of AIBN and 150.0 parts by mass of methyl ethyl ketone were mixed to yield a solution L2. The solution L2 was dripped into the flask over 15 minutes. After the dripping, heat reflux at 70° C. was carried out on the flask contents for additional 5 hours. Through above, the resin A (styrene-(meth)acrylic resin) was obtained. The resultant resin A had a mass average molecular weight (Mw) of 20,000 and an acid value of 100 mgKOH/g.

Here, the mass average molecular weight Mw of the resin A was measured using a gel filtration chromatography ("HLC-8020GPC", product of Tosoh Corporation) under the following conditions.
   Columns: "TSKgel SuperMultipore HZ-H" produced by Tosoh Corporation (semi-microcolumns with an inner diameter of 4.6 mm and a length of 15 cm)
   Number of columns: 3
   Eluent: tetrahydrofuran
   Flow rate: 0.35 mL/min.
   Sample injection amount: 10 μL
   Measurement temperature: 40° C.
   Detector: IR detector
   Calibration curves were plotted for n-propyl benzene and seven types of TSKgel Standard polystyrenes produced by Tosoh Corporation, F-40, F-20, F-4, F-1, A-5000, A-2500, and A-1000.

In addition, the acid value of the resin A was measured by a method in compliance with the Japanese Industrial Standards (JIS) K0070-1992 (Test methods for acid value, saponification value, ester value, iodine value, hydroxyl value and unsaponifiable matter of chemical products).

[Pigment Dispersion Preparation]
(Pigment Dispersion (C))

While the resin A was heated using a hot bath at 70° C., an aqueous sodium hydroxide solution in an amount necessary for neutralizing the resin A was added to the resin A. More specifically, an aqueous sodium hydroxide solution with a mass of 1.1 times the neutralization equivalent was added to the resin A. Through above, an aqueous solution of the resin A (resin A-Na) neutralized with sodium hydroxide was yielded. The aqueous solution of the resin A-Na had a pH of 8.

The vessel of a media type disperser ("DYNO (registered Japanese trademark) MILL", product of Willy A. Bachofen AG) was charged with 5 parts by mass of the aforementioned aqueous solution of the resin A-Na, 15 parts by mass of C.I. Pigment Blue 15:3, and water in an amount as shown in Table 1 so that the total amount reached 100 parts by mass. Note that the water was added so that the mass of the water including water contained in the aqueous sodium hydroxide solution used for neutralization of the resin A and water generated in neutralization reaction reached 80 parts by mass.

Next, a medium (zirconia beads with a diameter of 1.0 mm) was filled into the vessel so that the filling rate reached 70% by volume with respect to the capacity of the vessel. Dispersion was carried out on the vessel contents using the media type disperser. Through the above, a pigment dispersion (C) being a pigment dispersion for cyan ink use was obtained.

The pigment dispersion (C) was diluted 300 times with water to yield a dilution. The dilution was measured using a dynamic light scattering type particle size distribution analyzer ("ZETASIZER NANO ZS", product of Malvern Instruments Ltd.) to determine a volume median diameter ($D_{50}$) of the pigment particles contained in the pigment dispersion (C). As a result, it was confirmed that pigment particles with a volume median diameter in a range of 70 nm to 130 nm were dispersed in the pigment dispersion (C).

(Pigment Dispersions (Y), (M), and (BK))

Pigment dispersion (Y), (M), and (BK) were prepared according to the same method as that for preparing the pigment dispersion (C) in all aspects other than that the types and the amounts of the components used were set as shown in Table 1. The pigment dispersions (Y), (M), and (BK) were pigment dispersions for yellow ink use, magenta ink use, and black ink use, respectively.

[Resin Emulsion]

Resin emulsions (R-1) to (R-6) shown in Table 2 were prepared as resin emulsions used for ink preparation. The resin emulsions (R-1) to (R-6) contained resin particles (r-1) to (r-6), respectively. Note that "(R)" in Table 2 indicates being a registered Japanese trademark. "ND" under $D_{50}$ indicates $D_{50}$ not being measured.

TABLE 2

| | Manufacturer | Model number | Resin particles | | $D_{50}$ [nm] | Solid content [% by mass] |
| --- | --- | --- | --- | --- | --- | --- |
| | | | Type | Component | | |
| R-1 | UBE Corporation | ETERNACOLL(R) UW-1527DF | r-1 | Polycarbonate polyurethane resin | ND | 30 |
| R-2 | Taisei Fine Chemical Co., Ltd. | WBR-2101 | r-2 | Polycarbonate polyurethane resin | 60 | 25.0 |
| R-3 | Mitsui Chemicals, Inc. | TAKELAK(R)W-635 | r-3 | Polycarbonate polyurethane resin | ND | 35 |
| R-4 | Japan Coating Resin Corporation | MOWINYL(R)6820 | r-4 | Styrene-(meth)acrylic resin | 80 | 51 |
| R-5 | Mitsubishi Chemical Corporation | APTLOK(R) BW-5635 | r-5 | Polyolefin resin | 140 | 30 |
| R-6 | Dainichiseika Color & Chemicals Mfg. Co., Ltd. | GEN-100 | r-6 | Acrylic resin | 110 | 50 |

Ink Preparation

Ink sets of Examples 1 to 10 and Comparative Examples 1 to 15 were prepared according to the following methods.

Example 1

(Cyan Ink)

Water, 15.0 parts by mass of the pigment dispersion (C) (containing 2.25 parts by mass of the cyan pigment and 0.75 parts by mass of the resin A-Na), 16.7 parts by mass of the resin emulsion (R-1) (containing 5.0 parts by mass of the resin particles (r-1)), 10.0 parts by mass of propylene glycol, 8.0 parts by mass triethylene glycol monobutyl ether, 17.0 parts by mass of dipropylene glycol monomethyl ether, 0.2 parts by mass of an acetylene glycol surfactant ("SURFYNOL (registered Japanese trademark) 440", product of Nissin Chemical Industry Co., Ltd., ethylene oxide adduct of acetylene glycol), and 0.2 parts by mass of a silicon surfactant ("SILFACE (registered Japanese trademark) SAG503A", product of Nissin Chemical Industry Co., Ltd., polyether-modified siloxane compound) were added into a beaker. The amount of water added was such that the total amount of the mixture in the beaker reached 100 parts by mass. The beaker contents were mixed at a rotational speed of 400 rpm using a stirrer ("THREE-ONE MOTOR BL-600", product of Shinto Scientific Co., Ltd.) to yield a mixed liquid. The mixed liquid was filtered using a filter (pore size of 5 μm) to remove foreign matter and coarse particles contained in the mixed liquid. Through the above, a cyan ink of Example 1 was obtained.

(Yellow Ink, Magenta Ink, and Black Ink)

A yellow ink, a magenta ink, and a black ink of Example 1 were respectively prepared according to the same method as that for preparing the cyan ink of Example 1 in all aspects other than use of the pigment dispersions (Y), (M), and (BK) in place of the pigment dispersion (C). The cyan ink, the yellow ink, the magenta ink, and the black ink of Example 1 were combined to make an ink set of Example 1.

Examples 2 to 10 and Comparative Examples 1 to 15

Ink sets of Examples 2 to 10 and Comparative Examples 1 to 15 (specifically, a cyan ink, a yellow ink, a magenta ink, and a black ink of each of Examples 2 to 10 and Comparative Examples 1 to 15) were prepared according to the same method as that for preparing the ink set of Example 1 (specifically, the cyan ink, the yellow ink, the magenta ink, and the black ink of Example 1) in all aspects other than changes in type and amount of each component to those shown in Tables 3 to 5.

Note that in Tables 3 to 5, "Pigment dispersion" indicates use of the pigment dispersion (C), (Y), (M), or (BK). In detail, it indicates that: the pigment dispersion (C) was used for cyan ink preparation; the pigment dispersion (Y) was used for yellow ink preparation; the pigment dispersion (M) was used for magenta ink preparation; and the pigment dispersion (BK) was used for black ink preparation. The numerical values each indicate a percentage content [% by mass]. "TEGMBE" indicates triethylene glycol monobutyl ether. "DPGMME" indicates dipropylene glycol monomethyl ether. "AG surfactant" indicates the acetylene glycol surfactant.

TABLE 3

| | Example | | | | | | | | | |
|---|---|---|---|---|---|---|---|---|---|---|
| | 1 | 2 | 3 | 4 | 5 | 6 | 7 | 8 | 9 | 10 |
| Pigment dispersion | 15.0 | 15.0 | 15.0 | 15.0 | 15.0 | 15.0 | 15.0 | 15.0 | 15.0 | 15.0 |
| Resin particles Type | r-1 | r-1 | r-1 | r-1 | r-2 | r-3 | r-1 | r-1 | r-1 | r-1 |
| % by mass | 5.0 | 5.0 | 5.0 | 5.0 | 5.0 | 5.0 | 5.0 | 5.0 | 3.0 | 8.0 |
| Propylene glycol | 10.0 | 7.0 | 9.0 | 11.0 | 10.0 | 10.0 | 5.0 | 15.0 | 10.0 | 10.0 |
| TEGMBE | 8.0 | 8.0 | 8.0 | 8.0 | 8.0 | 8.0 | 5.0 | 10.0 | 8.0 | 8.0 |
| DPGMME | 17.0 | 17.0 | 17.0 | 17.0 | 17.0 | 17.0 | 10.0 | 25.0 | 20.0 | 20.0 |
| AG surfactant | 0.2 | 0.2 | 0.2 | 0.2 | 0.2 | 0.2 | 0.2 | 0.2 | 0.2 | 0.2 |
| Silicone surfactant | 0.2 | 0.2 | 0.2 | 0.2 | 0.2 | 0.2 | 0.2 | 0.2 | 0.2 | 0.2 |
| Water | Rest | Rest | Rest | Rest | Rest | Rest | Rest | Rest | Rest | Rest |
| Total | 100 | 100 | 100 | 100 | 100 | 100 | 100 | 100 | 100 | 100 |

TABLE 4

| | Comparative Example | | | | | | | | | |
|---|---|---|---|---|---|---|---|---|---|---|
| | 1 | 2 | 3 | 4 | 5 | 6 | 7 | 8 | 9 | 10 |
| Pigment dispersion | 15.0 | 15.0 | 15.0 | 15.0 | 15.0 | 15.0 | 15.0 | 15.0 | 15.0 | 15.0 |
| Resin particles Type | r-1 | r-1 | r-1 | r-1 | r-1 | r-1 | r-1 | r-1 | r-4 | r-5 |
| % by mass | 5.0 | 5.0 | 5.0 | 5.0 | 5.0 | 5.0 | 1.0 | 10.0 | 5.0 | 5.0 |
| Propylene glycol | 3.0 | 20.0 | 10.0 | 10.0 | 10.0 | 10.0 | 10.0 | 10.0 | 10.0 | 10.0 |
| TEGMBE | 8.0 | 8.0 | 3.0 | 15.0 | 8.0 | 8.0 | 8.0 | 8.0 | 8.0 | 8.0 |
| DPGMME | 20.0 | 20.0 | 20.0 | 20.0 | 5.0 | 30.0 | 20.0 | 20.0 | 20.0 | 20.0 |
| AG surfactant | 0.2 | 0.2 | 0.2 | 0.2 | 0.2 | 0.2 | 0.2 | 0.2 | 0.2 | 0.2 |
| Silicone surfactant | 0.2 | 0.2 | 0.2 | 0.2 | 0.2 | 0.2 | 0.2 | 0.2 | 0.2 | 0.2 |
| Water | Rest | Rest | Rest | Rest | Rest | Rest | Rest | Rest | Rest | Rest |
| Total | 100 | 100 | 100 | 100 | 100 | 100 | 100 | 100 | 100 | 100 |

TABLE 5

| | Comparative Example | | | | |
|---|---|---|---|---|---|
| | 11 | 12 | 13 | 14 | 15 |
| Pigment dispersion | 15.0 | 15.0 | 15.0 | 15.0 | 15.0 |
| Resin     Type | 5.0 | 5.0 | 5.0 | 5.0 | 5.0 |
| particles  % by mass | r-1 | r-6 | r-1 | r-1 | r-1 |
| Propylene glycol | 10.0 | 10.0 | — | 10.0 | 10.0 |
| Butylene glycol | — | — | 10.0 | — | — |
| TEGMBE | 8.0 | 8.0 | 8.0 | — | 8.0 |
| Triethylene glycol monoethyl ether | — | — | — | 8.0 | — |
| DPGMME | — | 17.0 | 17.0 | 17.0 | — |
| Dipropylene glycol monoethyl ether | — | — | — | — | 17.0 |
| Triethylene glycol | 20.0 | — | — | — | — |
| AG surfactant | 1.0 | 0.2 | 0.2 | 0.2 | 0.2 |
| Silicone surfactant | 1.0 | 0.2 | 0.2 | 0.2 | 0.2 |
| Water | Rest | Rest | Rest | Rest | Rest |
| Total | 100 | 100 | 100 | 100 | 100 |

<Evaluation>

With respect to each of the ink sets of Examples 1 to 10 and Comparative Examples 1 to 15, occurrence or non-occurrence of mixed color bleeding, ejection stability, adhesion of formed images to recording mediums, and occurrence or non-occurrence of local agglomeration were evaluated according to the following methods. Evaluation results are shown below in Tables 6 to 8. Note that each evaluation was carried out at a temperature of 25° C. and a relative humidity of 60% unless otherwise stated.

[Evaluation Apparatus]

As an evaluation apparatus, a line head inkjet recording apparatus (test apparatus produced by KYOCERA Document Solutions Japan Inc.) was used. The evaluation apparatus included a conveyance table and four recording heads ("KJ4B-HD06MHG-STDV", product of KYOCERA Corporation) arranged in parallel to a printing direction. The recording heads included a recording head for black ink, a recording head for cyan ink, a recording head for magenta ink, and a recording head for yellow ink disposed in the stated order from upstream to downstream in the printing direction. Each recording head included 2656 nozzles. The recording heads are disposed at intervals of 55 cm. The recording heads were set to have an application voltage of 21 V, a drive frequency of 20 kHz, an ejection droplet amount of 3 pL, a head temperature of 32° C., and a resolution of 600 dpi, and the number of pre-ejection flushing cycles was set to 1000 cycles. A biaxially oriented polypropylene (OPP) film ("FOR-AQ", product of FUTAMURA CHEMICAL CO., LTD., one side thereof subjected to corona discharge) and a poly ethylene terephthalate (PET) film ("FE2001", product of FUTAMURA CHEMICAL CO., LTD., one side thereof subjected to corona discharge) were used each as a non-permeable recording medium. In detail, an image was formed on each of one sides of the OPP film and the PET film that have been subjected to corona discharge. In image formation using the evaluation apparatus, the conveyance table was preheated to 40° C. Furthermore, in image formation using the evaluation apparatus, the conveyance speed of the images was set to 30 m/min.

[Mixed Color Bleeding]

Using the evaluation apparatus, an evaluation image was formed on each recording medium (the OPP film and the PET film). Next, the recording medium with the evaluation image formed thereon was dried at 80° C. for 60 seconds using a dryer ("ON-300SB", product of AS ONE Corporation, constant temperature dryer). Mixed color bleeding was evaluated for the evaluation image after the drying.

(Evaluation Image)

Figure 1:
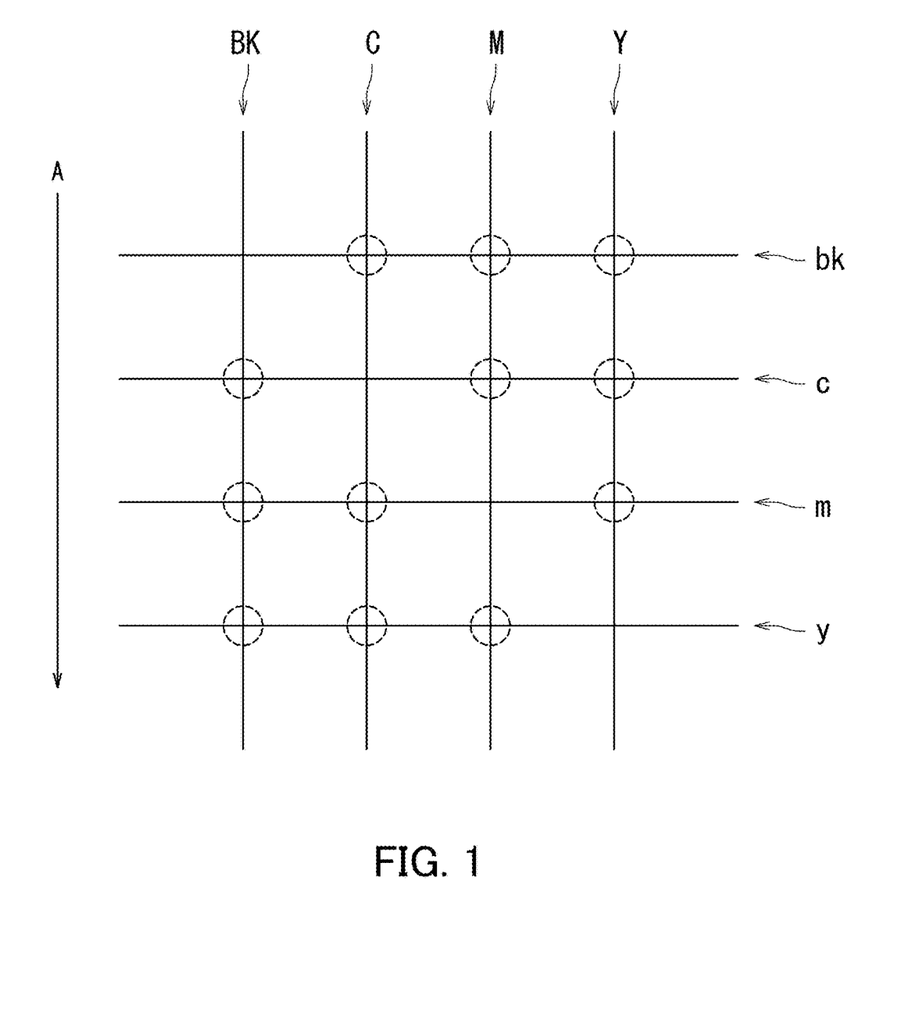
FIG. 1 is a diagram illustrating an evaluation image formed for evaluation in evaluation of mixed color bleeding carried out in Examples.
Figure 2:
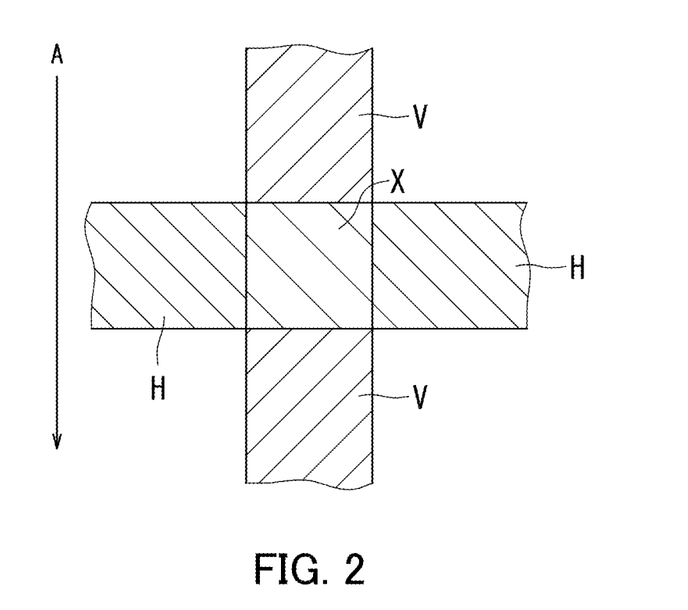
FIG. 2 is a view in an enlarged scale of an intersection point being an evaluation target in the evaluation image in FIG. 1.
Figure 3:
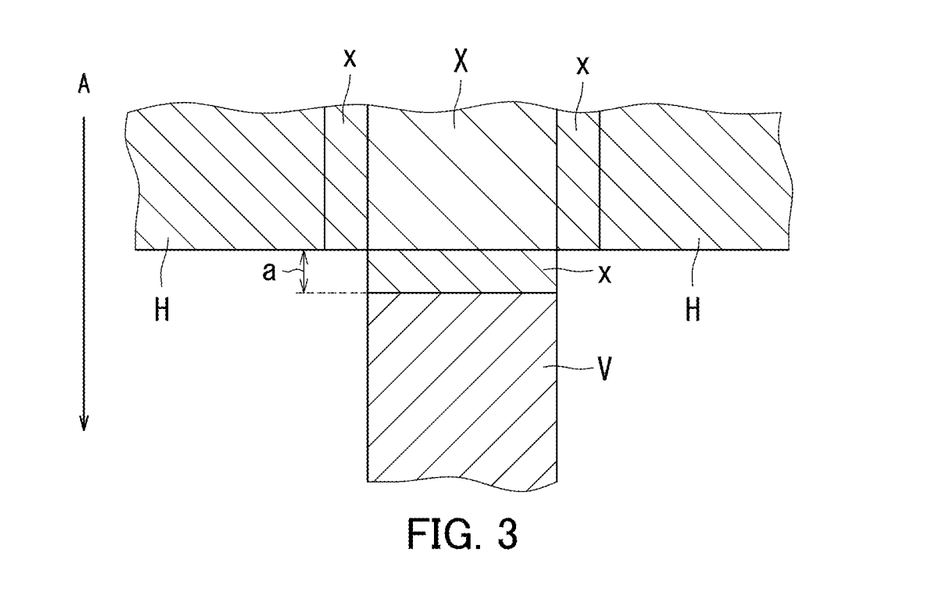
FIG. 3 is a view in a further enlarged scale of the intersection point in FIG. 2.

The evaluation image formed in evaluation of mixed color image was described with reference to FIGS. 1 to 3. Note that arrows A in FIGS. 1 to 3 each indicate the printing direction. The evaluation image illustrated in FIG. 1 is a grid-like image with four parallel vertical lines (a black vertical line BK, a cyan vertical line C, a magenta vertical line M, and a yellow vertical line Y) and four parallel horizontal lines (a black horizontal line bk, a cyan horizontal line c, a magenta horizontal line m, and a yellow horizontal line y). The four parallel vertical lines and the four parallel horizontal lines were orthogonal to each other. Each line had a line width of 1 cm and a printing rate of 100%.

As illustrated in FIG. 1, 16 intersection points of the vertical lines and the horizontal lines were present in the evaluation image. Of the 16 intersection points, an intersection point of the black vertical line BK and the black horizontal line bk, an intersection point of the cyan vertical line C and the cyan horizontal line c, an intersection point of the magenta vertical line M and the magenta horizontal line m, and an intersection point of the yellow vertical line Y and the yellow horizontal line y were excluded from evaluation and the other 12 intersection points were used as evaluation targets of mixed color bleeding. Circles drawn with dashed lines in FIG. 1 indicate the intersection points as the evaluation targets.

Description will be made of a method for evaluating mixed color bleeding. FIG. 2 is an enlarged view of one of the 12 intersection points being evaluation targets. As illustrated in FIG. 2, the intersection point is constituted by a vertical line V, a horizontal line H, and a mixed color area X where the vertical line V and the horizontal line H overlap with each other. The mixed color area X exhibits a mixed color of the color of the vertical line V and the color of the horizontal line H. Here, assuming that no mixed color bleeding occurs, the shape of the mixed color area X is square as illustrated in FIG. 2. By contrast, when mixed color bleeding occurs, the mixed color area X extends beyond the square and encroaches the vertical line V and the horizontal line H as illustrated in FIG. 3. As such, an area where the mixed color area X extends beyond the square and encroaches the vertical line V or the horizontal line H is taken as a mixed color bleeding area x. A mixed color bleeding width a was evaluated. Here, the mixed color bleeding width a refers to a length of the mixed color bleeding area x in the printing direction A from one of the four sides forming the mixed color area X that was located downstream in the printing direction A. The mixed color bleeding width a was measured at randomly selected 10 points in the mixed color bleeding area x and the average value of the 10 mixed color bleeding widths a was taken to be a measurement value of the mixed color bleeding width a.

The mixed color bleeding width a was measured at each of the 12 intersection points (24 points in total) as the evaluation targets of each of the two types of recording mediums (the OPP film and the PET film). The average value of the mixed color bleeding widths a measured at the 24 intersection points in total was taken to be an evaluation value of mixed color bleeding. Mixed color bleeding was evaluated according to the following criteria.

(Criteria for Mixed Color Bleeding)

A (good): evaluation value of less than 120 μm

B (somewhat poor): evaluation value of 120 μm or more and less than 250 μm

C (Poor): evaluation value of 250 μm or more

[Evaluation of Ejection Stability]

One ink droplet was ejected from each of the nozzles of the four recording heads toward one sheet of printing paper ("C²", product of Fuji Xerox Co., Ltd., A4-size plain paper) using the evaluation apparatus to form a dotted line. The printing paper with the dotted line formed thereon was taken to be an initial evaluation sheet. Next, solid images (printing rate 100%) were consecutively formed on 10,000 sheets of printing paper ("C²", product of Fuji Xerox Co., Ltd., A4-size plain paper) using the evaluation apparatus. Next, purging and wiping (maintenance operation) were performed one time on each recording head.

Directly after the maintenance operation, a dotted line was formed on one sheet of printing paper ("C²", product of Fuji Xerox Co., Ltd., A4-size plain paper). Specifically, one ink droplet was ejected from each of the nozzles of the four recording heads toward the sheet of the paper. The printing paper with the dotted line formed thereon as above was taken to be a post-print evaluation sheet.

Each of the initial evaluation sheet and the post-printing evaluation sheet obtained as above was observed using an image analyzer ("DOT ANALYZER DA-6000", product of Oji Scientific Instruments Co., Ltd., high-speed high-definition image processing analyzing system) to confirm the presence or absence of an artifact in the dotted line. More specifically, the displacement width in the horizontal direction of the initial evaluation sheet and the displacement width in the vertical direction of the initial evaluation sheet were measured for each of 2656 dots of the black ink, 2656 dots of the cyan ink, 2656 dots of the magenta ink, and 2656 dots of the yellow ink on the initial evaluation sheet. From the measurement results, a number average value ($3\sigma x$ [μm]) of the displacement widths in the horizontal direction of the initial evaluation sheet and a number average value ($3\sigma y$ [μm]) of the displacement widths in the vertical direction of the initial evaluation sheet were calculated. Thereafter, a displacement width $3\sigma$ [μm] of the dotted line on the initial evaluation sheet was calculated using a calculation formula "$3\sigma = 3\sqrt{(\sigma x)^2 + (\sigma y)^2}$". The calculated displacement width was taken to be $3\sigma$ of the initial evaluation sheet. The same operation was carried out on the post-printing evaluation sheet to calculate a displacement width $3\sigma$ [μm] of the dotted line on the post-printing evaluation sheet. The calculated displacement width was taken to be $3\sigma$ of the post-printing evaluation sheet.

Next, a variation $\Delta 3\sigma$ [μm] in the displacement width between the dotted lines on the initial evaluation sheet and those on the post-printing evaluation sheet was calculated using a calculation formula "$\Delta 3\sigma = |(3\sigma \text{ of initial evaluation sheet}) - (3\sigma \text{ of post-printing evaluation sheet})|$". Ejection stability was evaluated according to the following criteria.

(Criteria for Ejection Stability)

A (good): variation $\Delta 3\sigma$ of less than 3 μm

B (poor): variation $\Delta 3\sigma$ of 3 μm or more

[Adhesion]

Using the evaluation apparatus, a black solid image, a cyan solid image, a magenta solid image, and a yellow solid image (each with a size of 40 mm by 40 mm and a printing rate of 100%) were formed on respective 4 parts of each non-permeable recording medium (the PET film and the OPP film). Each non-permeable recording medium with the four solid images formed thereon was dried at 80° C. for 60 seconds using the aforementioned dryer. The films after the drying were each taken to be an evaluation film. With respect to each of the four solid images on the evaluation film, a grid-like pattern of 6 vertical incisions and 6 horizontal incisions was made at intervals of 2 mm to form 25 square cells of 2 mm on each side. Adhesive tape ("CELLOTAPE (registered Japanese trademark) CT-24", product of Nichiban Co., Ltd.) was attached onto each of the solid images with the incisions, and then peeled off at approximately 60 degrees (peeling). The adhesive tape peeling was carried out at a speed at which the time from the start to the end of the peeling was 1 second. After the peeling, the evaluation films were observed. Adhesion was evaluated according to the following criteria.

(Criteria for Determining Adhesion)

A (good): No peeling-off was observed on any of solid images of respective colors after the peeling.

B (poor): Partial or entire peeling off was observed on at least one of solid images of respective colors.

[Local Agglomeration]

Figure 4:
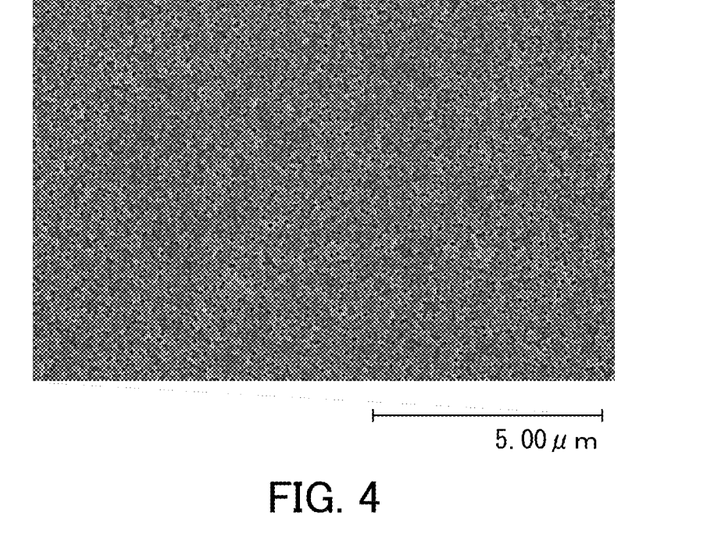
FIG. 4 is a photograph of a reference example of an evaluation image with no local agglomeration in evaluation of local agglomeration carried out in Examples.
Figure 5:
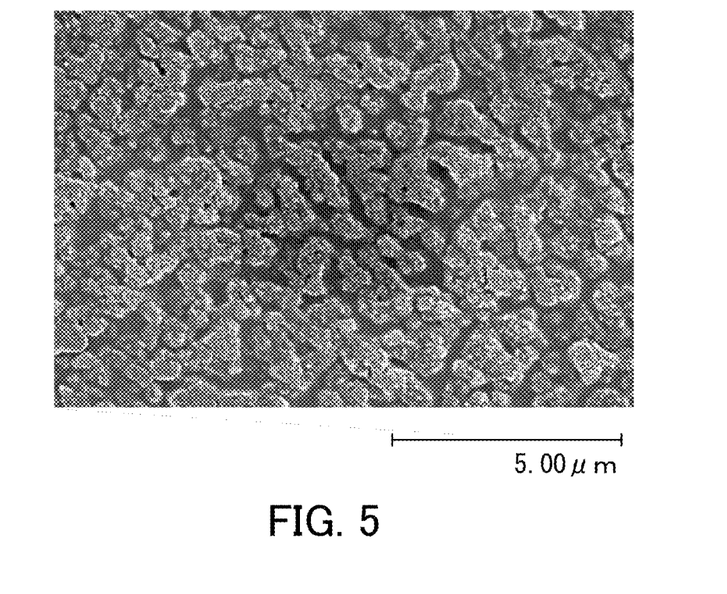
FIG. 5 is a photograph of a reference example of an evaluation image with local agglomeration in evaluation of local agglomeration carried out in Examples.

Using the evaluation apparatus, a black solid image, a cyan solid image, a magenta solid image, and a yellow solid image (each with a size of 40 mm by 40 mm and a printing rate of 100%) were formed on respective 4 parts of each non-permeable recording medium (the PET film and the OPP film). Each non-permeable recording medium with the four solid images formed thereon was dried at 80° C. for 60 seconds using the aforementioned dryer. The films after the drying were each taken to be an evaluation film. An image of the central part of each of the four solid images formed on the evaluation film was captured at a magnitude of 10,000× using a scanning electron microscope (SEM, "JSM-7900F", product of JEOL Ltd.). As shown in FIG. 4, a solid image with no local agglomeration has a uniform surface. As shown in FIG. 5 by contrast, a solid image with local agglomeration shows micrometer-order sea-island patterns (e.g., sea-island patterns with island patterns with a major axis of 1 μm or more) on the surface thereof. Note that the major axis of the island patterns indicates an average value of the major axes of randomly selected 10 island patterns. Local agglomeration was evaluated according to the following criteria.

(Criteria for Local Agglomeration)

A (good): No micrometer-order sea-island patterns were observed in any of the solid images.

B (poor): A micrometer-order sea-island pattern was observed in at least one of the solid images.

TABLE 6

|  |  | Example | | | | | | | | | |
| --- | --- | --- | --- | --- | --- | --- | --- | --- | --- | --- | --- |
|  |  | 1 | 2 | 3 | 4 | 5 | 6 | 7 | 8 | 9 | 10 |
| Mixed color bleeding | Evaluation value [μ m] | 100 | 70 | 80 | 110 | 90 | 100 | 70 | 70 | 60 | 60 |
|  | Evaluation | A | A | A | A | A | A | A | A | A | A |
| Ejection stability | Evaluation value [μ m] | 1.2 | 1.0 | 1.5 | 1.3 | 1.3 | 1.6 | 1.4 | 1.2 | 1.4 | 1.6 |
|  | Evaluation | A | A | A | A | A | A | A | A | A | A |
| Adhesion (PET) |  | A | A | A | A | A | A | A | A | A | A |
| Adhesion (OPP) |  | A | A | A | A | A | A | A | A | A | A |

TABLE 6-continued

| | Example | | | | | | | | | |
|---|---|---|---|---|---|---|---|---|---|---|
| | 1 | 2 | 3 | 4 | 5 | 6 | 7 | 8 | 9 | 10 |
| Local agglomeration (PET) | A | A | A | A | A | A | A | A | A | A |
| Local agglomeration (OPP) | A | A | A | A | A | A | A | A | A | A |

TABLE 7

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| Mixed color bleeding | Evaluation value [μm] | 80 | 300 | 200 | 400 | 350 | 90 | 80 | 80 | 70 | 70 |
| | Evaluation | A | C | B | C | C | A | A | A | A | A |
| Ejection stability | Evaluation value [μm] | 5.0 | 2.0 | 1.5 | 1.5 | 2.0 | 4.0 | 1.5 | 4.0 | 1.8 | 1.9 |
| | Evaluation | B | A | A | A | A | B | A | B | A | A |
| Adhesion (PET) | | A | A | A | A | A | A | B | A | A | A |
| Adhesion (OPP) | | A | A | A | A | A | A | B | A | A | A |
| Local agglomeration (PET) | | A | A | A | A | A | A | A | A | B | B |
| Local agglomeration (OPP) | | A | A | A | A | A | A | A | A | B | B |

TABLE 8

| | | Comparative Example | | | | |
|---|---|---|---|---|---|---|
| | | 11 | 12 | 13 | 14 | 15 |
| Mixed color bleeding | Evaluation value [μm] | 400 | 200 | 200 | 300 | 200 |
| | Evaluation | C | B | B | C | B |
| Ejection stability | Evaluation value [μm] | 1.5 | 1.5 | 4.0 | 5.0 | 6.0 |
| | Evaluation | A | A | B | B | B |
| Adhesion (PET) | | A | A | A | A | A |
| Adhesion (OPP) | | A | C | C | C | C |
| Local agglomeration (PET) | | A | B | B | B | B |
| Local agglomeration (OPP) | | A | B | B | B | B |

As shown in Tables 1 to 5, each ink of the ink sets of Examples 1 to 10 contained a pigment, resin particles, dipropylene glycol monomethyl ether, triethylene glycol monobutyl ether, and propylene glycol. The resin particles contained polycarbonate polyurethane resin. The resin particles had a percentage content of at least 2.0% by mass and no greater than 9.0% by mass. The dipropylene glycol monomethyl ether had a percentage content of at least 7.0% by mass and no greater than 27.0% by mass. The triethylene glycol monobutyl ether had a percentage content of at least 4.0% by mass and no greater than 12.0% by mass. The propylene glycol had a percentage content of at least 4.0% by mass and no greater than 18.0% by mass. As shown in Tables 6 to 8, each ink of the ink sets of Examples 1 to 10 were excellent in ejection stability. Furthermore, in image formation on each non-permeable recording medium, the ink formed images with excellent adhesion to the recording medium while inhibiting occurrence of mixed color bleeding and local agglomeration.

By contrast, each ink of the ink set of Comparative Example 1 was rated as having poor ejection stability. It is thought that due to each ink of the ink set of Comparative Example 1 containing an insufficient amount of propylene glycol which exhibits moisturizing effect, ink attached to the vicinity of each nozzle of the recording heads readily dried with a result that a solid content thereof precipitated.

Each ink of the ink set of Comparative Example 2 caused mixed color bleeding in the formed images. It is thought that due to containing an excessive amount of propylene glycol which is poor in quick drying among the specific organic solvents, each ink of the ink set of Comparative Example 2 was poor in quick drying.

Each ink of the ink set of Comparative Example 3 caused mixed color bleeding in the formed images. Each ink of the ink set of Comparative Example 3 contained an insufficient amount of propylene glycol monobutyl ether which is excellent in wet spreadability. It is thought that due to staying long in one place without getting wet and spreading after landing on each recording medium, each ink of the ink set of Comparative Example 3 was poor in quick drying.

Each ink of the ink set of Comparative Example 4 caused mixed color bleeding in the formed images. Each ink of the ink set of Comparative Example 4 contained an excessive amount of propylene glycol monobutyl ether which is excellent in wet spreadability. As a result, it is thought that each ink of the ink set of Comparative Example 4 excessively wetted and spread out in each recording medium after landing on the recording medium and adjacent ink droplets thereof coalesced to cause mixed color bleeding.

Each ink of the ink set of Comparative Example 5 caused mixed color bleeding in the formed images. It is thought that due to containing an insufficient amount of dipropylene glycol monomethyl ether which is excellent in quick drying, each ink of the ink set of Comparative Example 5 was poor in quick drying.

Each ink of the ink set of Comparative Example 6 was rated as having poor ejection stability. It is thought that due to each ink of the ink set of Comparative Example 6 containing an excessive amount of dipropylene glycol monomethyl ether which is excellent in quick drying, ink attached to the vicinity of each nozzle of the recording heads readily dried with a result that a solid content thereof precipitated.

Each ink of the ink set of Comparative Example 7 was rated as having poor adhesion in images formed with the ink. It is thought that due to containing an insufficient amount of the resin particles which function as a binder, each ink of the ink set of Comparative Example 7 did not form an image with excellent adhesion.

Each ink of the ink set of Comparative Example 8 was rated as having poor ejection stability. It is thought that due to each ink of the ink set of Comparative Example 8 containing an excessive amount of the resin particles, ink attached to the vicinity of each nozzle of the recording heads readily dried with a result that a solid content thereof precipitated.

Each ink of the ink sets of Comparative Examples 9 and 10 was rated as having poor local agglomeration. The resin particles contained in each ink of the ink sets of Comparative Examples 9 and 10 contained a resin other than polycarbonate polyurethane resin which is excellent in film formability. It is therefore thought that the pigment particles and the resin particles separated from each other in each ink of the ink sets of Comparative Examples 9 and 10 to cause local agglomeration.

Each ink of the ink set of Comparative Example 11 caused mixed color bleeding in the formed images. It is thought that due to containing triethylene glycol which is poor in quick drying rather than dipropylene glycol monomethyl ether which is excellent in quick drying, each ink of the ink set of Comparative Example 11 was poor in quick drying.

Each ink of the ink set of Comparative Example 12 was rated as having poor mixed color bleeding, adhesion, and local agglomeration in the formed images. The resin particles contained in each ink of the ink sets of Comparative Example 12 contained a resin other than polycarbonate polyurethane resin which is excellent in film formability. It is therefore thought that each ink of the ink sets of Comparative Example 12 did not form an image with excellent adhesion and the pigment particles and the resin particles separated from each other to cause local agglomeration.

Each ink of the ink set of Comparative Example 13 was rated as having poor ejection stability. It is thought that due to each ink of the ink set of Comparative Example 13 containing butylene glycol rather than propylene glycol which exhibits moisturizing effect, ink attached to the vicinity of each nozzle of the recording heads readily dried with a result that a solid content thereof precipitated. Furthermore, each ink of the ink set of Comparative Example 13 was rated as having poor mixed color bleeding, adhesion, and local agglomeration in the formed images.

Each ink of the ink set of Comparative Example 14 caused mixed color bleeding in the formed images. It is thought that due to containing triethylene glycol monoethyl ether rather than triethylene glycol monobutyl ether which has low surface free energy to a recording medium, quick drying of each ink of the ink set of Comparative Example 14 was insufficient. Furthermore, each ink of the ink set of Comparative Example 14 was rated as having poor ejection stability and poor local agglomeration and adhesion in the formed images.

Each ink of the ink set of Comparative Example 15 was rated as having poor adhesion in the formed images. It is thought that due to containing dipropylene glycol monoethyl ether rather than dipropylene glycol monomethyl ether which is excellent in quick drying, each ink of the ink set of Comparative Example 15 was poor in quick drying. Furthermore, each ink of the ink set of Comparative Example 15 was also poor in ejection stability and local agglomeration and mixed color bleeding in the formed images.

What is claimed is:

1. An inkjet ink comprising:
a pigment, resin particles, dipropylene glycol monomethyl ether, triethylene glycol monobutyl ether, and propylene glycol, wherein
the resin particles contain polycarbonate polyurethane resin,
the resin particles have a percentage content of at least 2.0% by mass and no greater than 9.0% by mass,
the dipropylene glycol monomethyl ether has a percentage content of at least 7.0% by mass and no greater than 27.0% by mass,
the triethylene glycol monobutyl ether has a percentage content of at least 4.0% by mass and no greater than 12.0% by mass, and
the propylene glycol has a percentage content of at least 4.0% by mass and no greater than 18.0% by mass.

2. The inkjet ink according to claim 1, wherein
the resin particles have a volume median diameter of at least 50 nm and no greater than 200 nm.

3. The inkjet ink according to claim 1, further comprising a surfactant, wherein
the surfactant includes a silicone surfactant and an acetylene glycol surfactant.

* * * * *